United States Patent
Zhang (10) Patent No.: US 12,068,962 B2
(45) Date of Patent: Aug. 20, 2024

(54) SERVICE OFFLOADING METHOD, APPARATUS, AND SYSTEM, ELECTRONIC DEVICE, AND STORAGE MEDIUM

(71) Applicant: TENCENT TECHNOLOGY (SHENZHEN) COMPANY LIMITED, Guangdong (CN)

(72) Inventor: Zhuoyun Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 17/451,746

(22) Filed: Oct. 21, 2021

(65) Prior Publication Data

US 2022/0038378 A1 Feb. 3, 2022

Related U.S. Application Data

(63) Continuation of application No. PCT/CN2020/120325, filed on Oct. 12, 2020.

(30) Foreign Application Priority Data

Nov. 8, 2019 (CN) .......................... 201911089188.0

(51) Int. Cl.
*H04L 47/125* (2022.01)
*H04L 47/2441* (2022.01)
*H04L 61/4511* (2022.01)

(52) U.S. Cl.
CPC ........ *H04L 47/125* (2013.01); *H04L 47/2441* (2013.01); *H04L 61/4511* (2022.05)

(58) Field of Classification Search
CPC ... H04L 47/125; H04L 47/2441; H04L 47/24; H04L 61/4511
See application file for complete search history.

(56) References Cited

U.S. PATENT DOCUMENTS

| 11,245,717 B1 * | 2/2022 | Edwards ............. H04L 63/1433 |
| 2007/0195755 A1 | 8/2007 | Li et al. |

(Continued)

FOREIGN PATENT DOCUMENTS

| AU | 2008226426 A1 * | 10/2009 | ........... H04L 1/0025 |
| AU | 2008225151 B2 * | 6/2012 | ......... G06F 12/0813 |

(Continued)

OTHER PUBLICATIONS

Ericsson 3GPP TSG-CT WG3 Meeting #105 C3-193085 Add DN-AAA Re -authentication 30.8 J=I 2019(Aug. 30, 2019) (7 pages).

(Continued)

*Primary Examiner* — Chi H Pham
*Assistant Examiner* — Ladislav Y Agureyev
(74) *Attorney, Agent, or Firm* — ARENTFOX SCHIFF LLP (57) ABSTRACT

Aspects of the disclosure provide methods and apparatuses for service offloading. In some examples, a processing circuitry of an electronic device detects that received information associated with a service flow satisfies a preset rule, and generates an offloading strategy that uses a first network address in the received information associated with the service flow as an offloading address. Then, the processing circuitry offloads a first uplink data packet associated with the service flow from a terminal device to an edge network according to the offloading strategy in response to a destination address of the first uplink data packet matching the offloading address. Non-transitory computer-readable storage medium counterpart embodiments are also contemplated.

20 Claims, 6 Drawing Sheets

(56) References Cited

U.S. PATENT DOCUMENTS

| | | | | |
|---|---|---|---|---|
| 2011/0075675 A1* | 3/2011 | Koodli | ............... | H04M 15/41 370/401 |
| 2012/0057550 A1* | 3/2012 | Zhao | ............... | H04W 88/16 370/328 |
| 2016/0065482 A1* | 3/2016 | Curtis | ............... | H04L 43/026 709/220 |
| 2019/0053117 A1 | 2/2019 | Bae et al. | | |
| 2019/0075046 A1* | 3/2019 | Yu | ............... | H04L 61/4511 |
| 2019/0141536 A1* | 5/2019 | Bachmutsky | ............... | H04L 67/10 |
| 2019/0158997 A1 | 5/2019 | Starsinic et al. | | |
| 2020/0045770 A1* | 2/2020 | Hu | ............... | H04W 4/24 |
| 2020/0245182 A1* | 7/2020 | Chitta | ............... | H04W 28/0252 |
| 2020/0351626 A1* | 11/2020 | Libby | ............... | H04M 15/66 |
| 2021/0014733 A1* | 1/2021 | Soliman | ............... | H04M 15/64 |
| 2021/0289390 A1 | 9/2021 | Zhou et al. | | |
| 2021/0352042 A1 | 11/2021 | You et al. | | |

FOREIGN PATENT DOCUMENTS

| | | | | |
|---|---|---|---|---|
| CN | 108882305 A | 11/2018 | | |
| CN | 109218455 A | 1/2019 | | |
| CN | 109429270 A | 3/2019 | | |
| CN | 109889586 A | 6/2019 | | |
| CN | 109951880 A | 6/2019 | | |
| CN | 110198363 A | 9/2019 | | |
| CN | 110912835 A | 3/2020 | | |
| JP | 2019121975 A | 7/2019 | | |
| WO | 2012052569 A1 | 4/2012 | | |
| WO | 2018145669 A1 | 8/2018 | | |
| WO | WO-2018161632 A1 * | 9/2018 | ......... | H04L 41/0896 |
| WO | WO-2019148568 A1 * | 8/2019 | ........... | H04L 47/122 |
| WO | WO-2019149177 A1 * | 8/2019 | ......... | H04L 47/2441 |
| WO | 2019/186504 A1 | 10/2019 | | |

OTHER PUBLICATIONS

3GPP Technical Specification Group Services and System Aspects 3GPP TR 26.891 VI.2.0 5G Enhanced Mobile Broadband; Media Distribution (Release 15) 31.7 J=I 2018(Jul. 31, 2018) (40 pages).
International Search Report dated Jan. 4, 2021 issued in PCT/CN2020/120325 (9 pages).
Japanese Office Action issued May 23, 2023 in Application No. 2022-518308, with English Translation, pp. 1-14.
Supplementary European Search Report issued Aug. 1, 2022 in Application No. 20885398.6, pp. 1-9.
Chinese Office Action issued Nov. 21, 2022 in Application No. 201911089188.0, with Concise English Translation, pp. 1-14.
M. Luo, "Cellular Network Traffic Monitoring and Cache Service Optimization Based on Mobil Edge Computing", China Master's Theses Fulltext Database, Series 9, Sep. 15, 2019, pp. 1-72.

* cited by examiner

FIG. 10

SERVICE OFFLOADING METHOD, APPARATUS, AND SYSTEM, ELECTRONIC DEVICE, AND STORAGE MEDIUM

RELATED APPLICATIONS

This application is a continuation of International Application No. PCT/CN2020/120325, entitled "SERVICE OFFLOADING METHOD, APPARATUS, AND SYSTEM, ELECTRONIC DEVICE, AND STORAGE MEDIUM" and filed on Oct. 12, 2020, which claims priority to Chinese Patent Application No. 201911089188.0, entitled "SERVICE OFFLOADING METHOD, APPARATUS, AND SYSTEM, ELECTRONIC DEVICE AND STORAGE MEDIUM" filed on Nov. 8, 2019. The entire disclosures of the prior applications are hereby incorporated by reference in their entirety.

FIELD OF THE TECHNOLOGY

This application relates to the field of computer and communication technologies, including a service offloading method, apparatus, and system, an electronic device, and a storage medium.

BACKGROUND OF THE DISCLOSURE

Currently, in a 5G standardization solution of 3GPP, an offloading solution for a local network can be used, to route specific service flows to the local network. A main offloading solution includes an uplink classifier (UL CL for short) solution and an Internet Protocol Version 6 (IPv6 for short) multi-homing solution.

SUMMARY

Aspects of the disclosure provide a method for service offloading. The method includes detecting that received information associated with a service flow satisfies a preset rule, and generating an offloading strategy that uses a first network address in the received information associated with the service flow as an offloading address. Then, the method includes offloading a first uplink data packet associated with the service flow from a terminal device to an edge network according to the offloading strategy in response to a destination address of the first uplink data packet matches the offloading address.

Aspects of the disclosure also provide an apparatus for service offloading. The apparatus include processing circuitry. The processing circuitry detects that received information associated with a service flow satisfies a preset rule, and generates an offloading strategy that uses a first network address in the received information associated with the service flow as an offloading address. Then, the processing circuitry offloads a first uplink data packet associated with the service flow from a terminal device to an edge network according to the offloading strategy in response to a destination address of the first uplink data packet matching the offloading address.

Aspects of the disclosure also provide a non-transitory computer-readable storage medium storing instructions which when executed by at least one processor cause the at least one processor to perform the method of service offloading.

BRIEF DESCRIPTION OF THE DRAWINGS

Accompanying drawings herein are incorporated into and constitute a part of this specification, show embodiments that conform to the present disclosure, and are used together with this specification to describe the principle of the present disclosure. The accompanying drawings in the following description show some embodiments of the present disclosure, and a person of ordinary skill in the art may still derive other drawings from these accompanying drawings. In the accompanying drawings.

DESCRIPTION OF EMBODIMENTS

Exemplary implementations will now be described more thoroughly with reference to the accompanying drawings. However, the exemplary implementations can be implemented in various forms, and it is not to be understood as being limited to the examples described herein. On the contrary, the exemplary implementations are provided to make the descriptions of this disclosure more comprehensive and complete, and comprehensively convey the idea of the exemplary implementations to a person skilled in the art. The accompanying drawings are merely schematic illustrations of this disclosure, and are not necessarily drawn to scale. The same reference numbers in the accompanying drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the exemplary implementations of this disclosure. However, a person skilled in the art is to be aware that, the technical solutions in this disclosure may be implemented without one or more of the particular details, or another method, unit, or step may be used. In other cases, well-known structures, methods, implementations, or operations are not shown or described in detail, to avoid obscuring the aspects of this disclosure.

Some of the block diagrams shown in the accompanying drawings are function entities and do not necessarily correspond to physically or logically independent entities. The function entities may be implemented in the form of software, or implemented in one or more hardware modules or integrated circuits, or implemented in different networks and/or processor apparatuses and/or micro-controller apparatuses.

Currently, in a 5G standardization solution of 3GPP, an offloading solution for a local network (that is, an edge network) is proposed, to route specific service flows to the local network. A main offloading solution includes an uplink classifier solution and an Internet Protocol Version 6 (IPv6) multi-homing solution. However, offloading rules of the two solutions need to be configured on a session management function (SMF for short) before a service flow is initiated, which is a relatively static configuration manner and cannot satisfy specific service scheduling requirements.

Implementations of the uplink classifier solution are as follows:

In an uplink classifier-based offloading solution, a session management function entity may determine to insert an uplink classifier on a data path of a packet data unit (PDU for short) session. The uplink classifier is a function supported by a user plane function (UPF for short) entity, and is configured to offload some data to a local network according to a data filter issued by the session management function entity. The insertion or deletion of an uplink classifier is determined by the session management function entity, and the session management function entity controls the user plane function entity through an N4 interface. During establishment of a packet data unit session connection, or after establishment of a packet data unit session is completed, the session management function entity may determine to insert a user plane function entity supporting the uplink classifier on the data path of the packet data unit session. After the establishment of the packet data unit session is completed, the session management function entity may determine to delete a user plane function entity supporting the uplink classifier on the data path of the packet data unit session, or delete an uplink classifier function on the user plane function entity supporting the uplink classifier. The session management function entity may include one or more user plane function entities included on the data path of the packet data unit session.

User equipment (UE for short) does not perceive that data is offloaded by the uplink classifier, nor is involved in the process of inserting or deleting the uplink classifier. The uplink classifier provides uplink data to be forwarded to the local network or to a core user plane function entity, and aggregates data transmitted to the UE, that is, aggregates data transmitted to the UE from the local network and the core user plane function entity. The operation is based on data detection and a data offloading rule provided by the session management function entity. The uplink classifier applies a filtering rule (for example, detects an Internet Protocol (IP for short) address/prefix of an uplink classifier data packet that is transmitted by the UE) and determines how the data packet is routed.

In this solution, configuration of the offloading rule is implemented by issuing the offloading rule to the user plane function entity by the session management function entity, or the offloading rule is transmitted to the session management function entity through an application function (AF for short), and then issued to the user plane function entity by the session management function entity. The configuration manner of the offloading rule usually belongs to a static configuration manner.

However, in practical application deployment, based on a specific service scenario, requirements for setting the offloading rules are dynamic, and needs to be detected by the user plane functional entity in a service flow to configure the specific offloading rules. The offloading rules based on a static configuration cannot meet specific service scheduling requirements. For this reason, this disclosure provides a service offloading method.

Figure 1:
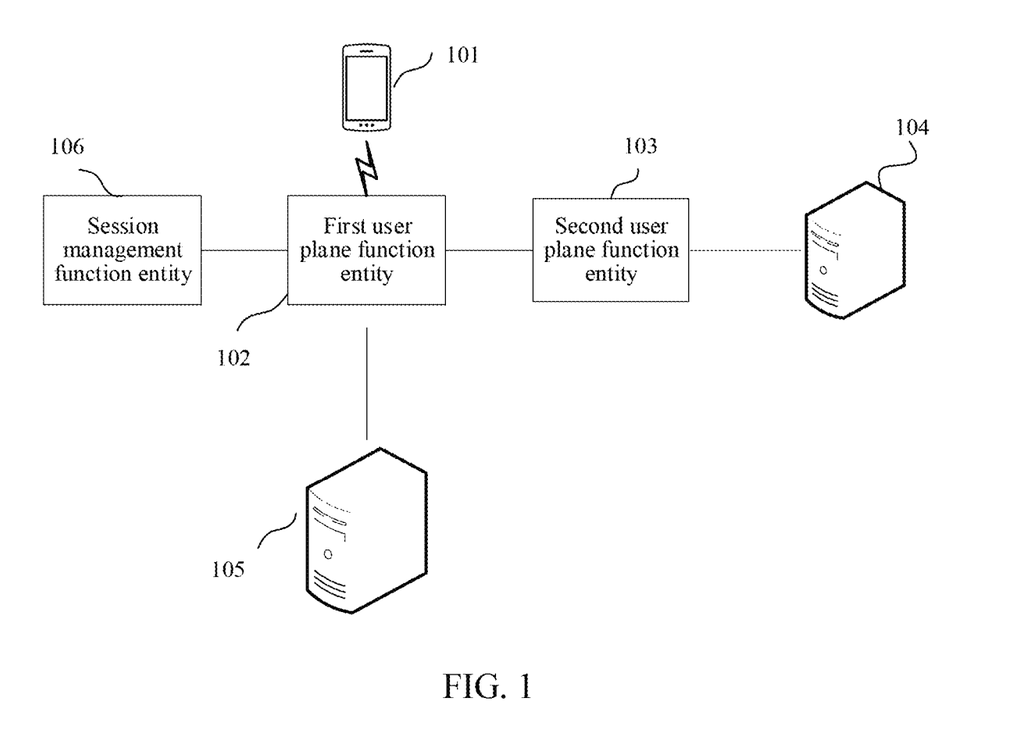
FIG. 1 is a diagram of a system architecture to which a service offloading method according to an exemplary embodiment of this disclosure is applicable

FIG. 1 is a schematic diagram of an exemplary system architecture to which a technical solution according to an embodiment of the present disclosure is applicable.

As shown in FIG. 1, the system architecture may include a terminal device 101, a first user plane function entity 102, a second user plane function entity 103, a server 104, an edge network 105, and a session management function entity 106. The terminal device 101 may be a mobile phone shown in FIG. 1, or a device capable of accessing a mobile communication network, such as a tablet computer, a portable computer, a desktop computer, an Internet of Things device, or a smart watch. The first user plane function entity 102 is connected to an edge computing device in the edge network 105, and is configured to forward communication data between the terminal device 101 and the edge network 105. The second user plane function entity 103 is connected to the server 104, and is configured to forward communication data between the terminal device 101 and the server 104.

It is to be understood that, quantities of terminal devices, first user plane function entities, second user plane function entities, servers, edge computing devices, and session management function entities in FIG. 1 are merely exemplary. According to implementation needs, there may be any quantity of terminal devices, first user plane function entities, second user plane function entities, servers, edge networks, session management function entities, or the like. A person skilled in the art may understand that access devices such as base stations are not included in FIG. 1, and are not mentioned in the solution because the solution has no impact on an access device accessing a network. However, a person skilled in the art may understand that the session connection in this solution includes an access device such as a base station or non-3GPP access (for example, Wi-Fi), that is, the terminal device is first connected to an access device such as a base station, and then connected to a user plane function entity by the access device.

In an embodiment of the present disclosure, the first user plane functional entity 102 presets a service flow detection rule, detects the service flow data according to the preset rule after the terminal device 101 or the server 104 transmits the service flow data to the first user plane functional entity 102, and extracts a network address in the service flow data as an offloading address to generate an offloading strategy when the detection result meets the preset rule. The first user plane function entity 102 offloads an uplink service flow data packet that is transmitted by the terminal device 101 and that has a destination address being the offloading address to the edge network 105 according to the offloading strategy.

In an embodiment of the present disclosure, after generating the offloading strategy, the first user plane function entity 102 reports the offloading strategy to the session management function entity 106, and the session management function entity 106 performs decision-making on the offloading strategy. In response to agreeing to the offloading strategy, the session management function entity 106 returns a response message agreeing to the offloading strategy to the first user plane function entity 102, and the first user plane function entity 102 determines to configure the offloading strategy after receiving the response message; or in response to not agreeing to the offloading strategy, the session management function entity 106 returns a response message rejecting the offloading strategy to the first user plane function entity 102, and the first user plane function entity 102 rejects to configure the offloading strategy after receiving the response message.

Figure 2:
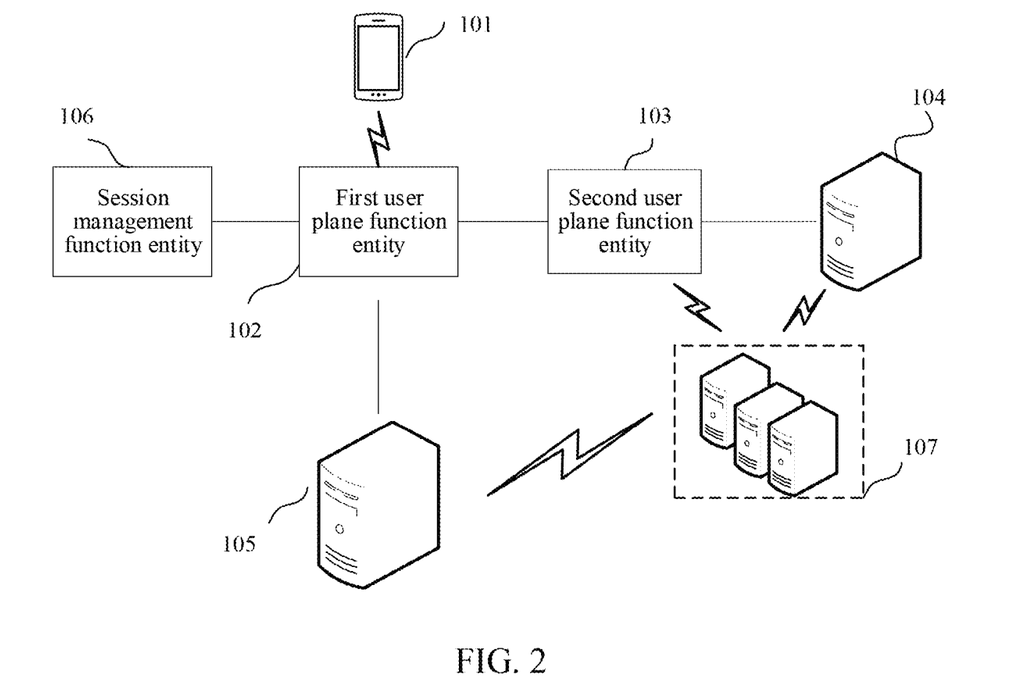
FIG. 2 is a diagram of a system architecture to which a service offloading method according to an exemplary embodiment of this disclosure is applicable.

FIG. 2 is a diagram of a system architecture to which a service offloading method according to an exemplary embodiment of this disclosure is applicable. The difference between the system architecture shown in FIG. 2 and the system architecture shown in FIG. 1 is that the system architecture shown in FIG. 2 is applicable to a scenario in which the service flow data detected by the first user plane function entity is a DNS response message. In the system architecture shown in FIG. 2, a service scheduler 107 is added, and the server 104 is a DNS server.

Based on the system architecture shown in FIG. 2, in an embodiment of the present disclosure, the terminal device 101 generates a DNS request and transmits the DNS request to the first user plane function entity 102, the first user plane function entity 102 forwards the DNS request to the second user plane function entity 103, and then the second user plane function entity 103 transmits the DNS request to the DNS server 104. The DNS server 104 generates a DNS response message according to the DNS request, and then forwards the DNS response message to the terminal device 101 through the second user plane function entity 103 and the first user plane function entity 102. The DNS server may be global server load balance (GSLB).

In an embodiment of the present disclosure, after receiving the DNS response message forwarded by the second user plane function entity 103, the first user plane function entity 102 detects the DNS response message according to the preset rule, uses a network address included in the DNS response message as an offloading address when a detection result satisfies the preset rule, to generate an offloading strategy, and transmits the DNS response message to the terminal device 101.

In an embodiment of the present disclosure, after the first user plane function entity 102 generates the offloading strategy, when a destination address of a service flow data packet transmitted by the terminal device 101 matches an offloading address of the offloading strategy, the first user plane function entity 102 offloads the service flow data packet to the edge network 105. After the edge network 105 receives the service flow data packet, the edge computing device in the edge network 105 may replace a source address of the service flow data packet with a network address of the edge computing device and transmit the modified service flow data packet to the service scheduler 107.

In an embodiment of the present disclosure, after receiving the modified service flow data packet, the service scheduler 107 may identify the modified service flow data packet according to the source address (that is, the network address of the edge computing device) and determine, according to a service deployment situation, whether the edge network 105 in which the edge computing device is located can process a service access request of the terminal device. When the service scheduler 107 identifies that the edge network 105 in which the edge computing device is located can process the service access request of the terminal device 101, the generated response message carries a network address of a service server deployed in the edge network 105; or when the service scheduler 107 identifies that the edge network 105 in which the edge computing device is located cannot process the service access request of the terminal device, the generated response message carries a network address of a service server deployed in a core data center.

In an embodiment of the present disclosure, after generating the response message carrying the network address of the service server deployed in the edge network 105, the service scheduler 107 may transmit the response message to the edge computing device in the edge network 105, and then the edge computing device replaces a destination address of the response message with a destination address of the terminal device and transmits the response message to the first user plane function entity 102.

In an embodiment of the present disclosure, after receiving the response message transmitted by the first user plane function entity, the terminal device 101 may obtain the network address of the service server in the edge network 105 by parsing the response message, and then initiate a service access request to the edge network 105 based on the network address of the service server in the edge network 105.

The edge network in this embodiment of the present disclosure is located in an edge computing center. The edge computing center is relative to the core data center. The core data center is a centralized data center at a back end. A user may access the core data center through a network to obtain data needed, but a distance between the user and the core data center may be relatively large, which may increase a service access delay, while the edge data center is a place closest to the user, and may maintain real-time data update with the core data center through a wide area network, to directly provide the user with a good service.

Figure 3:
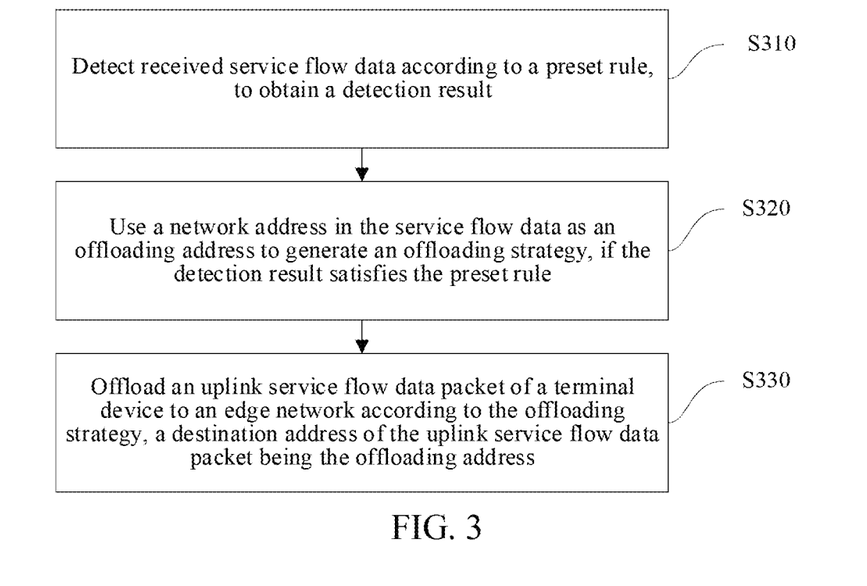
FIG. 3 is a flowchart of a service offloading method according to an embodiment of this disclosure.

FIG. 3 is a flowchart of a service offloading method according to an embodiment of this disclosure. The service offloading method may be performed by a user plane function entity, for example, by the first user plane function entity 102 shown in FIG. 1 or FIG. 2. Referring to FIG. 3, the method includes the following steps:

In step S310: received service flow data (also referred to as received information associated with a service flow) is detected according to a preset rule, to obtain a detection result.

In step S320: a network address (also referred to as a first network address) in the service flow data is used as an offloading address to generate an offloading strategy, when the detection result satisfies the preset rule.

In step S330: an uplink service flow data packet (also referred to as a first uplink data packet associated with the service flow) of a terminal device is offloaded to an edge network according to the offloading strategy, a destination address of the uplink service flow data packet is the offloading address.

The steps are described below in detail.

In step S310, received service flow data is detected according to a preset rule, to obtain a detection result. The first user plane function entity is configured with a detection rule for service flow data. After receiving the service flow data, the first user plane function entity detects the service flow data according to the preset rule, to obtain the detection result.

In step S320, a network address in the service flow data is used as an offloading address to generate an offloading strategy, when the detection result satisfies the preset rule.

In an embodiment of the present disclosure, after the first user plane function entity uses the network address in the service flow data as the offloading address to generate the offloading strategy, there are two subsequent processing manners:

In a first manner, after generating the offloading strategy, the first user plane function entity reports the offloading strategy to the session management function entity, to notify the session management function entity that the offloading strategy has been configured on the first user plane function entity side.

Figure 4:
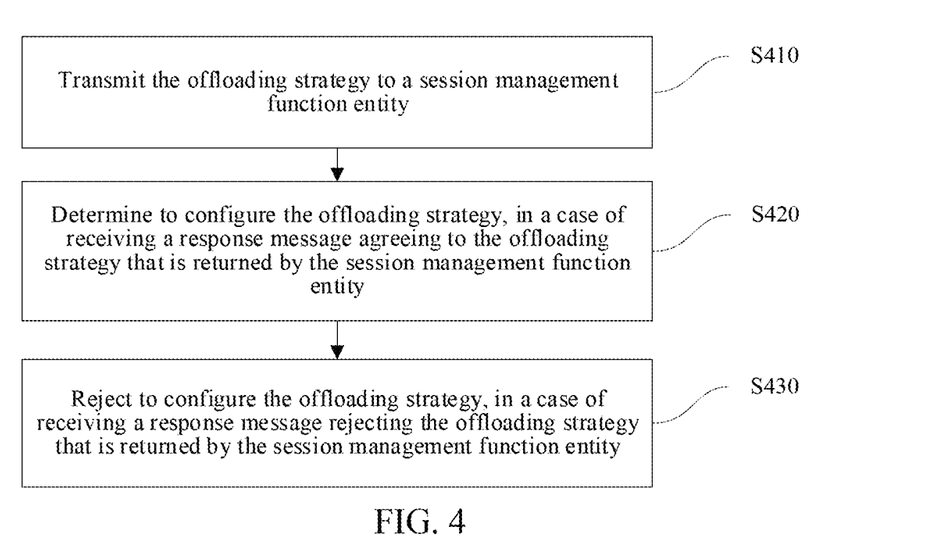
FIG. 4 is a flowchart of a service offloading method according to an embodiment of this disclosure.

In a second manner, after generating the offloading strategy, the first user plane function entity reports the offloading strategy to the session management function entity, and the session management function entity performs decision-making on a request of the offloading strategy. In this embodiment, referring to FIG. 4, after the first user plane function entity uses the network address in the service flow data as the offloading address to generate the offloading strategy, the method further includes the following steps:

In step S410: the offloading strategy is transmitted to a session management function entity;

In step S420: the offloading strategy is determined to configure (also referred to as is activated), in response to receiving a response message agreeing to the offloading strategy that is returned by the session management function entity.

In step S430: configuration of the offloading strategy is rejected (also referred to as is deactivated), in response to receiving a response message rejecting the offloading strategy that is returned by the session management function entity.

In step S420, after receiving an offloading strategy report message transmitted by the first user plane function entity, the session management function entity performs decision-making on the offloading strategy according to a strategy configured by an operator. In response to agreeing to the request of the offloading strategy of the first user plane function entity, the session management function entity transmits a response message agreeing to the request to the first user plane function entity. After receiving the response message agreeing to the offloading strategy that is returned by the session management function entity, the first user plane function entity determines to configure the offloading strategy.

In step S430, in response to rejecting the request of the offloading strategy of the first user plane function entity, the session management function entity transmits a response message rejecting the request to the first user plane function entity. After receiving the response message rejecting the offloading strategy that is returned by the session management function entity, the first user plane function entity rejects to configure the offloading strategy.

Referring to FIG. 3, in step S330, an uplink service flow data packet of a terminal device is offloaded to an edge network according to the offloading strategy, a destination address of the uplink service flow data packet being the offloading address.

Uplink service flow data is a service access request transmitted by the terminal device. Because the first user plane function entity is configured with an offloading strategy, the first user plane function entity offloads the uplink service flow data packet to the edge network according to the offloading strategy when the destination address of the uplink service flow data packet is consistent with the offloading address in the offloading strategy.

In the technical solution of this embodiment of the present disclosure, the user plane function entity detects the service flow to generate the offloading strategy in real time, so that flexible and real-time configuration of the offloading strategy is implemented, and a specific scheduling requirement for a service deployed in the edge network is satisfied.

Figure 5:
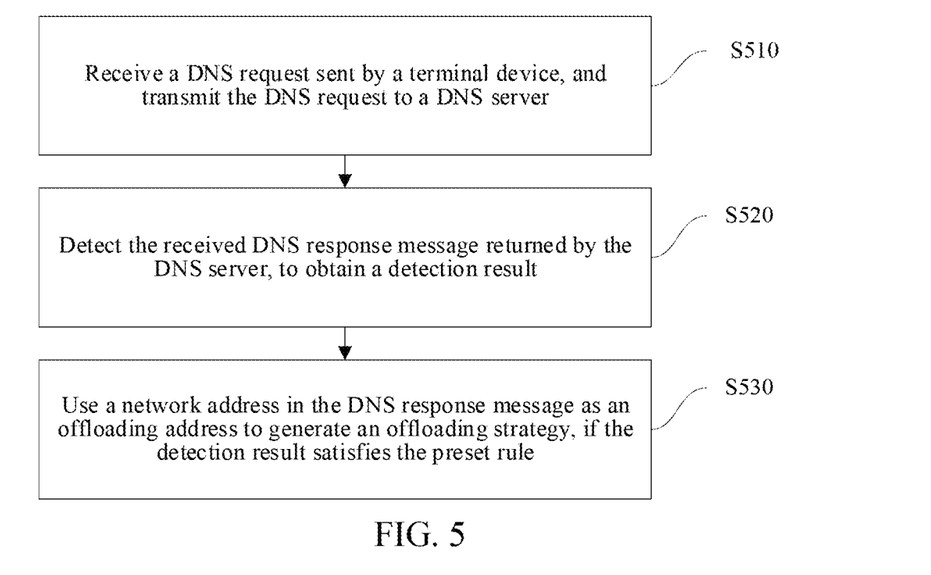
FIG. 5 is a flowchart of a service offloading method according to an embodiment of this disclosure.

In an embodiment of the present disclosure, when the service flow data detected by the first user plane function entity is a domain name system (DNS) response message, referring to FIG. 5, step S320 specifically includes the following steps:

In step S510: a DNS request transmitted by a terminal device is received, and the DNS request is transmitted to a DNS server.

In step S520: the received DNS response message returned by the DNS server is detected, to obtain a detection result.

In step S530: a network address included in the DNS response message is used as an offloading address to generate an offloading strategy, when the detection result satisfies the preset rule.

In step S510, a DNS request transmitted by the terminal device is received, and the DNS request is transmitted to a DNS server.

After generating the DNS request, the terminal device transmits the DNS request to the user plane function entity, the user plane function entity transmits the DNS request to the DNS server, and the DNS server generates a DNS response message in response to the DNS request. After generating the DNS response message, the DNS server transmits the DNS response message to the user plane function entity, and after receiving the DNS response message, the user plane function entity transmits the DNS response message to the terminal device.

In an embodiment of the present disclosure, the DNS request transmitted by the terminal device may be transmitted to the first user plane function entity through a base station device. After receiving the DNS request, the first user plane function entity forwards the DNS request to the DNS server through the second user plane function entity. In this embodiment, the first user plane function entity may be an I-UPF, and the second user plane function entity may be a PSA-UPF.

Still referring to FIG. 5, in step S520, the received DNS response message returned by the DNS server is detected, to obtain a detection result.

After receiving the DNS response message, the first user plane function entity detects the DNS response message according to the preset rule, to obtain the detection result.

In an embodiment of the present disclosure, the DNS response message is usually encapsulated with port information, such as port 53 (port 53 is opened by the DNS server and is mainly used for domain name resolution). Therefore, the first user plane function entity may determine, according to port information encapsulated in a received data packet, whether the DNS response message is received.

In step S530, a network address included in the DNS response message is used as an offloading address to generate an offloading strategy, when the detection result satisfies the preset rule.

In an embodiment of the present disclosure, the generating the offloading strategy based on the network address included in the DNS response message may be using the network address included in the DNS response message as the offloading address to generate the offloading strategy, for the first user plane function entity to offload the service flow data packet having a destination address being the offloading address to the edge network.

Figure 6:
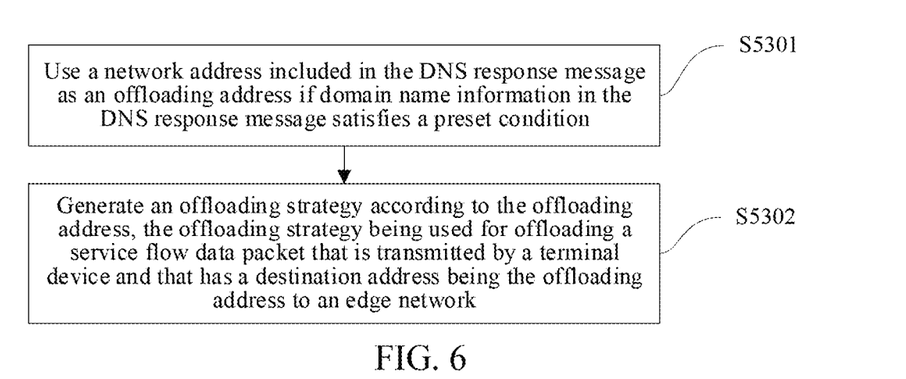
FIG. 6 is a flowchart of a service offloading method according to an embodiment of this disclosure.

In an embodiment of the present disclosure, in order to enable the first user plane function entity to offload the service flow data packet having a destination address being the offloading address to the edge network, a corresponding offloading strategy may be generated by the first user plane function entity, as shown in FIG. 6. Step S530 specifically includes step S5301 to step S5302, which are described in detail as follows.

In step S5301: the network address included in the DNS response message is used as the offloading address, when domain name information in the DNS response message satisfies a preset condition.

In an embodiment of the present disclosure, that the domain name information in the DNS response message satisfies a preset condition may be that the domain name information satisfies a condition of a target domain name, and the target domain name may be pre-configured and pre-stored in the first user plane function entity by an operator according to a request of a service party. By determining whether the domain name information in the DNS response message is the target domain name, whether to use the network address carried in the DNS response message as the offloading address is determined. When the domain name information in the DNS response message is a pre-stored target domain name, the network address in the DNS response message is extracted as the offloading address. When the domain name information in the DNS response message is not a pre-stored target domain name, the network address in the DNS response message is not extracted as the offloading address.

Still referring to FIG. 6, in step S5302, an offloading strategy is generated according to the offloading address, the offloading strategy being used for offloading a service flow data packet that is transmitted by the terminal device and that has a destination address being the offloading address to the edge network.

In an embodiment of the present disclosure, after the first user plane function entity generates the offloading strategy according to the network address included in the DNS response message, the following two subsequent processing manners are included:

In a first manner, after generating the offloading strategy, the first user plane function entity reports the offloading strategy to the session management function entity, to notify the session management function entity that the offloading strategy has been configured on the first user plane function entity side. At the same time, the first user plane function entity transmits a DNS response message to the terminal device, for the terminal device to transmit the service flow data packet according to the DNS response message.

In a second manner, after generating the offloading strategy, the first user plane function entity reports the offloading strategy to the session management function entity, and the session management function entity performs decision-making on a request of the offloading strategy. After a response of the session management function entity to the offloading strategy is received, the DNS response message is transmitted to the terminal device. In this embodiment, after the first user plane function entity generates the offloading strategy, the method further includes:

transmitting the offloading strategy to a session management function entity; and determining to configure the offloading strategy, in response to receiving a response message agreeing to the offloading strategy that is returned by the session management function entity, and transmitting the DNS response message to the terminal device, for the terminal device to transmit the service flow data packet according to the DNS response message.

In this embodiment, after receiving an offloading strategy report message transmitted by the first user plane function entity, the session management function entity performs decision-making on the offloading strategy according to a strategy configured by an operator. In response to agreeing to the request of the offloading strategy of the first user plane function entity, the session management function entity transmits a response message agreeing to the request to the first user plane function entity. After receiving the response message agreeing to the offloading strategy that is returned by the session management function entity, the first user plane function entity configures the offloading strategy, and transmits the DNS response message to the terminal device, for the terminal device to transmit the service flow data packet according to the DNS response message. For example, the terminal device may transmit the service flow data packet to the network address included in the DNS response message (the network address is a network address of a service scheduler assigned by the DNS server to the terminal device).

In response to rejecting the request of the offloading strategy of the first user plane function entity, the session management function entity transmits a response message rejecting the request to the first user plane function entity. After receiving a response message rejecting the offloading strategy that is returned by the session management function entity, the first user plane function entity still transmits the DNS response message to the terminal device, for the terminal device to transmit the service flow data packet according to the DNS response message. However, a difference from the session management function entity agreeing to the request of the offloading strategy of the first user plane function entity is that, the first user plane function entity does not configure the offloading strategy when the session management function entity rejects the offloading strategy of the first user plane function entity. Therefore, after receiving the service flow data packet transmitted by the terminal device, because no offloading strategy is configured for the network address of the service flow data packet, the service flow data packet is not offloaded to the edge network. However, when the session management function entity agrees to the offloading strategy of the first user plane function entity, the first user plane function entity configures the offloading strategy. Therefore, after the service flow data packet transmitted by the terminal device is received, because the offloading strategy is configured for the network address of the service flow data packet, the service flow data packet is offloaded to the edge network according to the offloading strategy, and then transmitted by the edge computing device to the service scheduler, for the edge computing device to modify a source address of the service flow data packet to ensure that the service scheduler identifies that the service flow data packet may be served by a service server in the edge network, thereby allocating a network address of the service server in the edge network in the returned response message.

Figure 7:
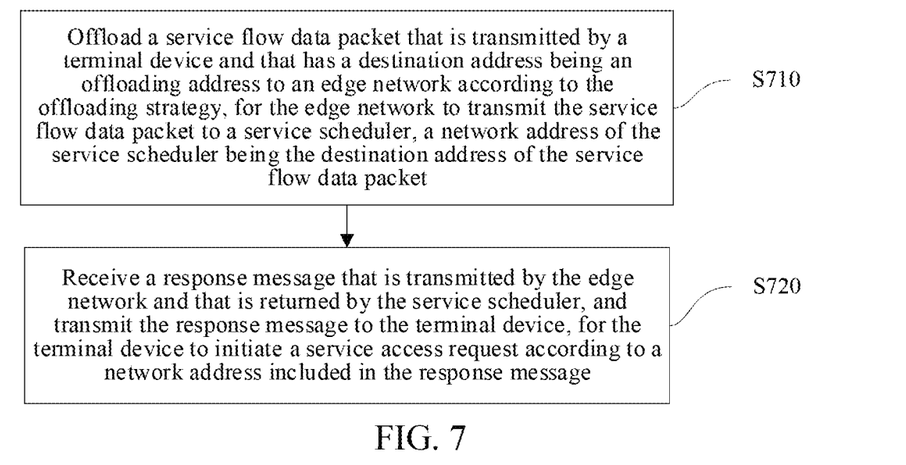
FIG. 7 is a flowchart of a service offloading method according to an embodiment of this disclosure.

In an embodiment of the present disclosure, after the first user plane function entity uses the network address included in the DNS response message as the offloading address to generate the offloading strategy, referring to FIG. 7, the method further includes the following steps:

In step S710: a service flow data packet that is transmitted by the terminal device and that has a destination address being the offloading address is offloaded to the edge network according to the offloading strategy, for the edge network to transmit the service flow data packet to a service scheduler, a network address of the service scheduler being the destination address of the service flow data packet.

In step S720: a response message that is transmitted by the edge network and that is returned (is generated in response to the service flow data packet and transmitted) by the service scheduler is received, and the response message is transmitted to the terminal device, for the terminal device to initiate a service access request according to a network address included in the response message.

In step S710, the service flow data packet transmitted by the terminal device carries the destination address of the service flow data packet, that is, the network address of the service scheduler. After receiving the service flow data packet transmitted by the terminal device, the first user plane function entity determines whether the destination address of the service flow data packet is the offloading address in the offloading strategy according to the configured offloading strategy. When the destination address of the service flow data packet is not the offloading address in the offloading strategy, the service flow data packet is not offloaded to the edge network. The service flow data packet is directly transmitted to the second user plane function entity, and then transmitted by the second user plane function entity to the service scheduler. In a case of not recognizing the edge network, the service scheduler allocates a network address of a service server located in a core data center to the terminal device, for the terminal device to initiate a service access request to the service server of the core data center. When the destination address of the service flow data packet is the offloading address in the offloading strategy, the service flow data packet is offloaded to the edge network, for the edge network to modify a source address of the service flow data packet to ensure that the service scheduler identifies that the edge network can process the service access request of the terminal device.

In an embodiment of the present disclosure, after the first user plane function entity offloads the service flow data packet to the edge network, an edge computing device in the edge network may replace the source address of the service flow data packet with a network address of the edge computing device and transmit the modified service flow data packet to the service scheduler. After receiving the modified service flow data packet, the service scheduler may identify the source address (that is, the network address of the edge computing device) and determine, according to a service deployment situation, whether the edge network in which the edge computing device is located can process the service access request of the terminal device. When the service scheduler identifies that the edge network in which the edge computing device is located can process the service access request of the terminal device, the generated response message carries a network address (also referred to as a second network address) of a service server deployed in the edge network; or when the service scheduler identifies that the edge network in which the edge computing device is located cannot process the service access request of the terminal device, the generated response message carries a network address of the service server deployed in the core data center.

Still referring to FIG. 7, in step S720, in response to identifying that the service server in the edge network can process the service access request of the terminal device, the service scheduler generates a response message including the network address (the second network address) of the service server in the edge network. After generating the response message, the service scheduler may transmit the response message to the edge computing device in the edge network, and the edge computing device replaces a destination address of the response message with a destination address of the terminal device and transmits the destination address of the terminal device to the first user plane function entity.

In an embodiment of the present disclosure, in response to identifying that the edge network cannot process the service access request of the terminal device, the service scheduler generates a response message including the network address of the service server of the core data center. After generating the response message, the service scheduler may transmit the response message to the edge computing device in the edge network. The edge computing device replaces a destination address of the response message with a network address of the terminal device, and transmits the network address of the terminal device to the first user plane function entity. Then the first user plane function entity transmits the response message to the terminal device, for the terminal device to initiate a service access request to the service server of the core data center.

In the foregoing embodiments, an offloading strategy is generated according to the network address of the service scheduler in the DNS response message returned by the DNS server. when transmitting a service flow data packet to the service scheduler, the terminal device forwards the service flow data packet to the edge network according to the offloading strategy, so that the service scheduler determines, according to the edge network in which the obtained network address of the edge computing device is located, whether the edge network can serve the service access request, and returns a response message to the terminal device. The terminal device can initiate the service access request according to the network address in the response message.

In this disclosure, the offloading strategy is generated in real time, and then a service is delivered to the terminal device through the service server in the edge network, which satisfies a specific service scheduling requirement. In addition, delivering the service to the terminal device through the service server in the edge network not only reduces a delay of the terminal device accessing the service, but also reduces bandwidth consumption of the core data center.

In an embodiment of the present disclosure, after the first user plane function entity transmits the response message to the terminal device, the following steps may be further included:

receiving an uplink service flow data packet transmitted by the terminal device;

transmitting the uplink service flow data packet to the edge network when a destination address of the uplink service flow data packet is consistent with the offloading address; and returning (also referred to as forwarding), in response to receiving a downlink service flow data packet for the terminal device that is returned by the edge network, the downlink service flow data packet to the terminal device.

In an embodiment of the present disclosure, after the first user plane function entity transmits the response message returned by the service scheduler to the terminal device, the terminal device may initiate a service access request according to the network address included in the response message. The uplink service flow data packet including the service access request is first transmitted to the first user plane function entity. when the destination address of the uplink service flow data packet is consistent with the offloading address, the first user plane function entity offloads the uplink service flow data packet to the service server in the edge network.

In an embodiment of the present disclosure, after receiving the downlink service flow data packet for the terminal device that is returned by the edge network, the first user plane function entity returns the downlink service flow data packet to the terminal device. After receiving the downlink service flow data packet returned by the edge network, an offloading device (that is, the first user plane function entity) may return a service response result to the terminal device through a base station or non-3GPP access.

Figure 8:
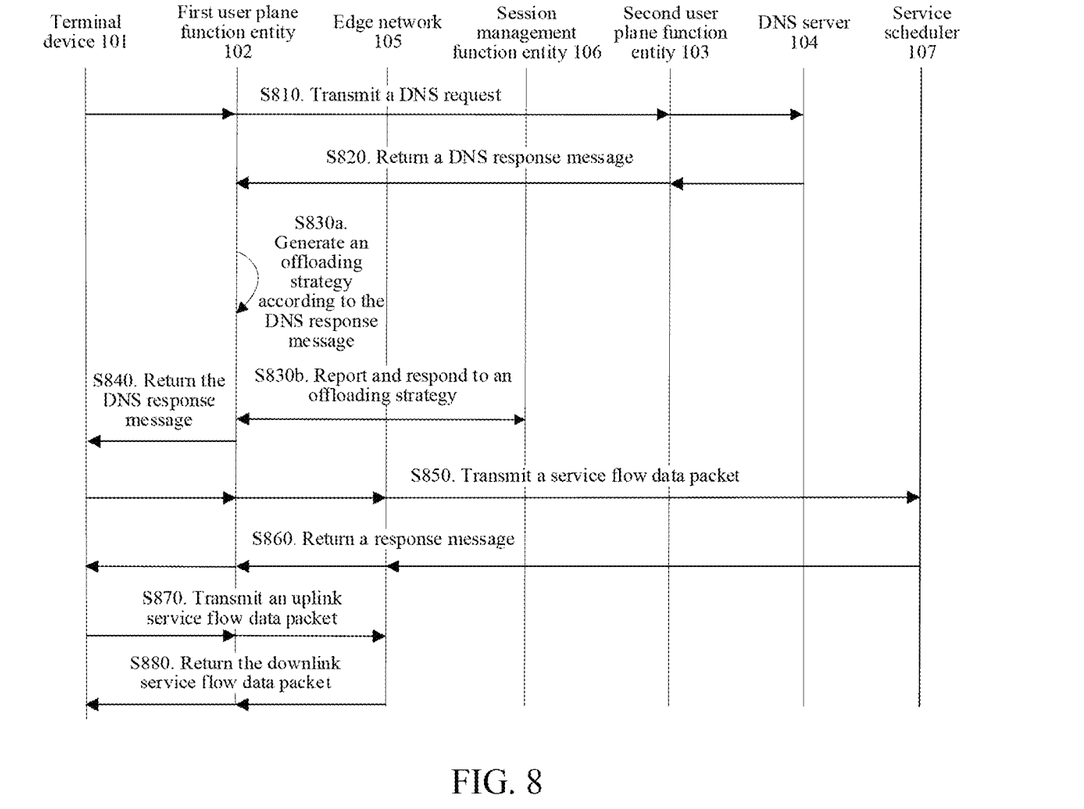
FIG. 8 is a schematic diagram of an interaction process of a service offloading system according to an embodiment of this disclosure.

FIG. 8 is a schematic diagram of an interaction process of a service offloading system according to an embodiment of this disclosure. The interaction process includes the following steps:

In step S810: A terminal device 101 transmits a DNS request to a DNS server 104, the DNS request being used to request the DNS server 104 to allocate a network address of a service scheduler. The terminal device 101 transmits a DNS request to a first user plane function entity 102 through a base station or non-3 GPP access. The first user plane function entity 102 forwards the DNS request to a second user plane function entity 103, and then the second user plane function entity 103 transmits the DNS request to the DNS server 104.

In step S820: The DNS server 104 selects a corresponding service scheduler 107 according to the DNS request, writes the network address of the service scheduler into a DNS response message, and transmits the DNS response message to the second user plane function entity 103 through the Internet. Then the second user plane function entity 103 transmits the DNS response message to the first user plane function entity 102.

In step S830a: After receiving the DNS response message, the first user plane function entity 102 detects the DNS response message according to a preset rule. When a detection result satisfies the preset rule, a domain name included in the DNS response message and the corresponding network address are extracted. When domain name information satisfies the preset rule of the first user plane function entity 102, the network address in the DNS response message is extracted as an offloading address, to generate an offloading strategy. The offloading strategy is used to forward a service flow data packet having a destination address matching the offloading address to an edge network.

In step S830b: After generating the offloading strategy, the first user plane function entity 102 reports the generated offloading strategy to a session management function entity 106. In an implementation, the first user plane function entity 102 notifies the session management function entity 106 that the offloading strategy has been configured. In another implementation, the first user plane function entity 102 transmits the offloading strategy to the session management function entity 106, and the session management function entity 106 performs decision-making on the offloading strategy; and In response to agreeing to a request of the offloading strategy, transmits a response message agreeing to the request to the first user plane function entity 102, and the first user plane function entity 102 determines to configure the offloading strategy; or in response to rejecting a request of the offloading strategy, transmits a response message rejecting the request to the first user plane function entity 102, and the first user plane function entity 102 rejects to configure the offloading strategy.

In step S840: The terminal device 101 receives the DNS response message returned by the first user plane function entity 102.

In step S850: After receiving the DNS response message, the terminal device 101 transmits the service flow data packet according to the network address of the service scheduler 107 that is included in the DNS response message. The service flow data packet is first transmitted by the terminal device 101 to the first user plane function entity 102. After receiving the service flow data packet, the first user plane function entity 102 forwards the service flow data packet to the edge network 105 according to the offloading strategy. An edge computing device in the edge network 105 replaces a source address of the service flow data packet with a network address of the edge computing device and transmits the network address of the edge computing device to the service scheduler 107. After receiving the modified service flow data packet, the service scheduler 107 may identify whether the edge network 105 in which the edge computing device is located can process a service access request of the terminal device according to the source address (that is, the network address of the edge computing device).

In step S860: The service scheduler 107 generates a response message according to the service flow data packet, and returns the response message to the first user plane function entity 102 through the edge network 105, and the first user plane function entity 102 returns the response message to the terminal device 101.

In an embodiment of the present disclosure, in response to identifying that the edge network 105 in which the edge computing device is located can process the service access request of the terminal device, the service scheduler 107 generates a response message including the network address of the service server in the edge network 105, and transmits the response message to the edge network 105. The edge computing device in the edge network 105 replaces a destination address of the response message with a destination address of the terminal device and transmits the destination address of the terminal device to the first user plane function entity 102.

In an embodiment of the present disclosure, when the service scheduler 107 identifies that the edge network 105 in which the edge computing device is located cannot process the service access request of the terminal device, the generated response message carries a network address of a service server deployed in a core data center.

In step S870: After transmitting the response message to the terminal device 101, the terminal device 101 may initiate a service access request according to the network address of the service server that is included in the response message. The uplink service flow data packet including the service access request is first transmitted to the first user plane function entity 102. Because a destination address of the uplink service flow data packet is consistent with the pre-configured offloading address, the first user plane function entity 102 offloads the uplink service flow data packet to the edge network 105.

In step S880: The first user plane function entity 102 receives a downlink service flow data packet for the terminal device 101 that is returned by the edge network 105, and returns the downlink service flow data packet to the terminal device 101.

Figure 9:
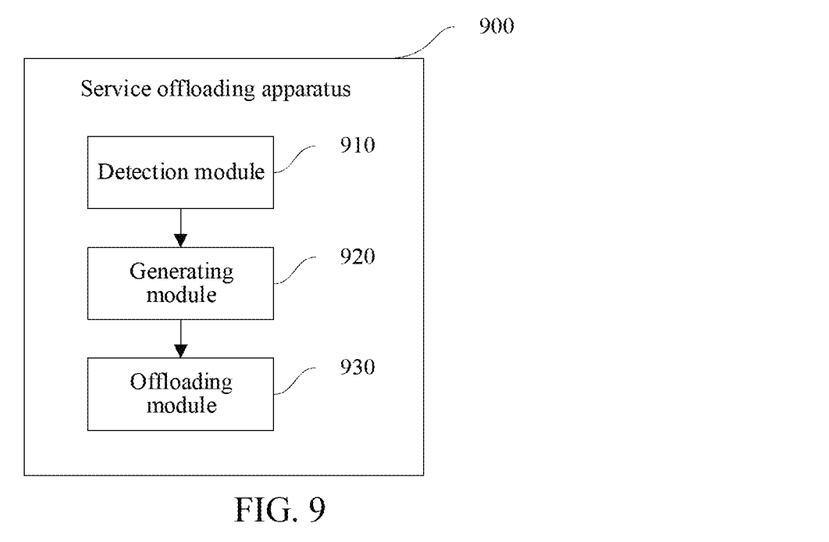
FIG. 9 is a block diagram of a service offloading apparatus according to an embodiment of this disclosure.

As shown in FIG. 9, according to an embodiment of this disclosure, a service offloading apparatus 900 is provided, and the apparatus 900 includes a detection module 910, a generating module 920, and an offloading module 930. It is noted that one or more modules, submodules, and/or units of the service offloading apparatus 900 can be implemented by processing circuitry, software, or a combination thereof, for example.

The detection module 910 is configured to detect received service flow data according to a preset rule, to obtain a detection result.

The generating module 920 is configured to use a network address in the service flow data as an offloading address to generate an offloading strategy, when the detection result satisfies the preset rule.

The offloading module 930 is configured to offload an uplink service flow data packet of a terminal device to an edge network according to the offloading strategy, a destination address of the uplink service flow data packet being the offloading address.

In an embodiment of the present disclosure, after the generating module 920 is configured to use a network address in the service flow data as an offloading address to generate an offloading strategy, when the detection result satisfies the preset rule, the apparatus further includes a transmission module, a configuration-determining module, and a configuration-rejecting module.

The transmission module is configured to transmit the offloading strategy to a session management function entity.

The configuration-determining module is configured to determine to configure the offloading strategy, in response to receiving a response message agreeing to the offloading strategy that is returned by the session management function entity.

The configuration-rejecting module is configured to reject to configure the offloading strategy, in a case in which a response message rejecting the offloading strategy that is returned by the session management function entity is received.

In an embodiment of the present disclosure, when the service flow data is a DNS response message, the generating module 920 includes a receiving unit, a detection unit, and a generating unit.

The receiving unit is configured to receive a DNS request transmitted by the terminal device, and transmit the DNS request to a DNS server.

The detection unit is configured to detect the received DNS response message returned by the DNS server, to obtain a detection result.

The generating unit is configured to use a network address included in the DNS response message as an offloading address to generate an offloading strategy, when the detection result satisfies the preset rule.

In an embodiment of the present disclosure, the generating unit is further configured to:

use the network address included in the DNS response message as the offloading address, when domain name information in the DNS response message satisfies a preset condition; and generate an offloading strategy according to the offloading address, the offloading strategy being used for offloading a service flow data packet that is transmitted by the terminal device and that has a destination address being the offloading address to the edge network.

In an embodiment of the present disclosure, after the generating unit is configured to use a network address included in the DNS response message as an offloading address to generate an offloading strategy, the apparatus is further configured to:

transmit the offloading strategy to a session management function entity; and determine to configure the offloading strategy, in response to receiving a response message agreeing to the offloading strategy that is returned by the session management function entity, and transmitting the DNS response message to the terminal device, for the terminal device to transmit the service flow data packet according to the DNS response message.

In an embodiment of the present disclosure, after the generating unit is configured to use a network address included in the DNS response message as an offloading address to generate an offloading strategy, the apparatus is further configured to:

offload a service flow data packet that is transmitted by the terminal device and that has a destination address being the offloading address to an edge network according to the offloading strategy, for the edge network to transmit the service flow data packet to a service scheduler, a network address of the service scheduler being the destination address of the service flow data packet; and receive a response message that is transmitted by the edge network and that is returned by the service scheduler, and transmit the response message to the terminal device, for the terminal device to initiate a service access request according to a network address included in the response message.

In an embodiment of the present disclosure, after transmitting the response message to the terminal device, the apparatus is further configured to:

receive an uplink service flow data packet transmitted by the terminal device;

transmit the uplink service flow data packet to the edge network when a destination address of the uplink service flow data packet is consistent with the offloading address; and return, when a downlink service flow data packet for the terminal device that is returned by the edge network is received, the downlink service flow data packet to the terminal device.

Figure 10:
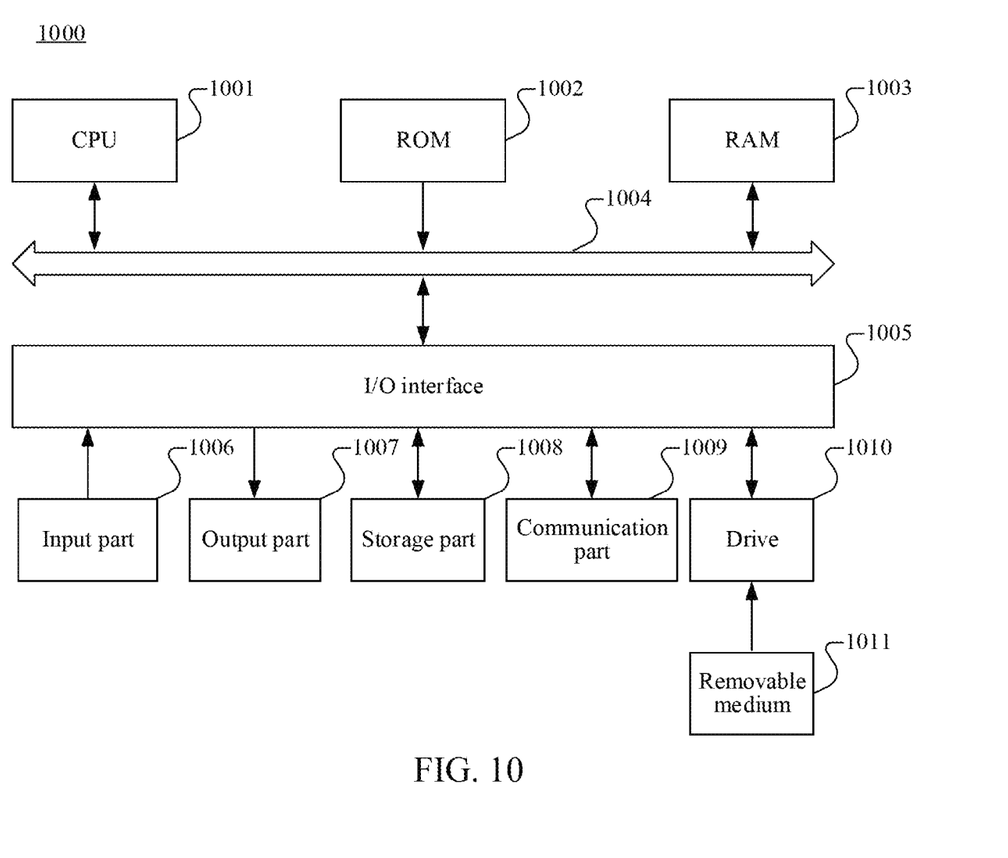
FIG. 10 is a schematic structural diagram of a computer system of an electronic device according to an embodiment of this disclosure.

FIG. 10 is a schematic structural diagram of a computer system of an electronic device adapted to implement any embodiment of the present disclosure.

A computer system 1000 of an electronic device shown in FIG. 10 is merely an example, and does not constitute any limitation on functions and use ranges of the embodiments of the present disclosure.

As shown in FIG. 10, the computer system 1000 includes processing circuitry such as a processor and a central processing unit (CPU) 1001, and can perform various appropriate actions and processing, for example, performing the method described in any embodiment of the present disclosure, according to a program stored in a read-only memory (ROM) (also referred to as a storage part) 1008 or a program loaded into a random access memory (RAM) 1003 from the storage part 1008. The RAM 1003 further stores various programs and data required for system operations. The CPU 1001, the ROM 1008, and the RAM 1003 are connected to each other through a bus 1004. An input/output (I/O) interface 1005 is also connected to the bus 1004.

The following components are connected to the I/O interface 1005: an input part 1006 including a keyboard, a mouse, or the like; an output part 1007 including a cathode ray tube (CRT), a liquid crystal display (LCD), a speaker, or the like; a storage part 1008 including a hard disk or the like; and a communication part 1009 of a network interface card, including a LAN card, a modem, or the like. The communication part 1009 performs communication processing by using a network such as the Internet. A drive 1010 is also connected to the I/O interface 1005 according to a requirement. A removable medium 1011, such as a magnetic disk, an optical disc, a magneto-optical disk, or a semiconductor memory, is installed on the drive 1010 as required, so that a computer program read from the removable medium is installed into the storage part 1008 as required.

Particularly, according to the embodiments of the present disclosure, the processes described in the following with reference to the flowcharts may be implemented as computer software programs. For example, the embodiments of the present disclosure include a computer program product, including a computer program carried on a computer-readable medium. The computer program includes program code for performing the method shown in the flowchart. In such an embodiment, the computer program may be downloaded and installed from a network through the communication part 1009, and/or installed from the removable medium 1011. when the computer program is executed by the processor or the CPU 1001, various functions defined in the method and apparatus of this disclosure are executed. In some embodiments, the computer system 1000 may further include an artificial intelligence (AI) processor. The AI processor is configured to process computing operations related to machine learning.

It is to be noted that, the computer-readable storage medium shown in the present disclosure may be a computer-readable signal medium, a computer-readable storage medium, or any combination thereof. The computer-readable storage medium may be, for example, but is not limited to, an electric, magnetic, optical, electromagnetic, infrared, or semi-conductive system, apparatus, or component, or any combination of the above. More specifically, the computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that contains or stores a program, and the program may be used by or combined with an instruction execution system, apparatus or device. In the present disclosure, the computer-readable signal medium may be a data signal included in a baseband or propagated as a part of a carrier, in which computer-readable program code is carried. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium (e.g., non-transitory computer-readable storage medium). The computer-readable medium may transmit, propagate, or transmit a program that is used by or used in conjunction with an instruction execution system, an apparatus, or a device. The program code included in the computer-readable medium may be transmitted by using any suitable medium, including but not limited to, wireless transmission, a wire, a cable, radio frequency (RF) or the like, or any other suitable combination thereof.

The technical solutions provided by the embodiments of this disclosure may include the following beneficial effects: A user plane function entity detects received service flow data according to a preset rule, uses a network address in the service flow data as an offloading address when a detection result satisfies the preset rule, to generate an offloading strategy, and offloads an uplink service flow data packet of a terminal device to an edge network according to the offloading strategy. As can be seen, in the technical solutions of the embodiments of the present disclosure, the user plane function entity detects the service flow to generate the offloading strategy in real time, so that flexible and real-time configuration of the offloading strategy is implemented, and a specific service requirement is satisfied. For example, in the technical solutions for service scheduling provided in the embodiments of this disclosure, a DNS response message may be detected by the user plane function entity. when the preset rule is satisfied, a corresponding address in the DNS response message may be configured as the offloading address, thereby offloading uplink service flow data to an edge computing device for specific processing, and meeting a specific scheduling requirement for a service deployed in the edge network.

Flowcharts and block diagrams in the drawings illustrate architectures, functions, and operations that may be implemented by using the system, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is also to be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

According to another aspect, this disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method in the following embodiments. For example, the electronic device may implement the steps shown in FIG. 3 to FIG. 7.

What is claimed is:

1. A method for service offloading, comprising:
    detecting that received information included in a service flow satisfies a preset rule;
    generating, by processing circuitry, an offloading strategy that uses a first network address in the received information included in the service flow as an offloading address when the received information included in the service flow is detected to satisfy the preset rule; and
    offloading a first uplink data packet associated with the service flow from a terminal device to an edge network according to the offloading strategy, a destination address of the first uplink data packet matching the offloading address.

2. The method according to claim 1, further comprising:
transmitting the offloading strategy to a session management function entity;
receiving a response message from the session management function entity;
activating the offloading strategy, in response to the response message agreeing to the offloading strategy; and
deactivating the offloading strategy, in response to the response message rejecting the offloading strategy.

3. The method according to claim 1, wherein the received information associated with the service flow is a domain name system (DNS) response message, and the method comprises:
receiving a DNS request transmitted by the terminal device;
transmitting the DNS request to a DNS server;
receiving the DNS response message returned by the DNS server;
detecting that the DNS response message satisfies the preset rule; and
generating the offloading strategy that uses the first network address in the DNS response message as the offloading address.

4. The method according to claim 3, wherein the detecting that the DNS response message satisfies the preset rule comprises:
detecting that domain name information in the DNS response message satisfies a preset condition.

5. The method according to claim 3, further comprising:
transmitting the offloading strategy to a session management function entity;
receiving a response message returned by the session management function entity, the response message agreeing to the offloading strategy;
activating the offloading strategy in response to the response message; and
transmitting the DNS response message to the terminal device.

6. The method according to claim 3, wherein the edge network transmits the first uplink data packet with a source address modification to a service scheduler having the destination address and the method further comprises:
receiving a response message that is returned by the service scheduler in response to the first uplink data packet with the source address modification, the response message comprising a second network address associated with the edge network; and
transmitting the response message, to the terminal device, for the terminal device to initiate a service access request according to the second network address associated with the edge network.

7. The method according to claim 6, further comprising:
receiving a second uplink data packet transmitted by the terminal device;
transmitting the second uplink data packet to the edge network in response to a destination address of the second uplink data packet matching the offloading address; and
forwarding, in response to receiving a downlink data packet for the terminal device and from the edge network, the downlink data packet to the terminal device.

8. An apparatus for service offloading, comprising processing circuitry configured to:
detect that received information included in a service flow satisfies a preset rule;
generate an offloading strategy that uses a first network address in the received information included in the service flow as an offloading address when the received information included in the service flow is detected to satisfy the preset rule; and
offload a first uplink data packet associated with the service flow from a terminal device to an edge network according to the offloading strategy, a destination address of the first uplink data packet matching the offloading address.

9. The apparatus according to claim 8, wherein the processing circuitry is configured to:
transmit the offloading strategy to a session management function entity;
receive a response message from the session management function entity;
activate the offloading strategy, in response to the response message agreeing to the offloading strategy; and
deactivate the offloading strategy, in response to the response message rejecting the offloading strategy.

10. The apparatus according to claim 8, wherein the received information associated with the service flow is a domain name system (DNS) response message, and the processing circuitry is configured to:
receive a DNS request transmitted by the terminal device;
transmit the DNS request to a DNS server;
receive the DNS response message returned by the DNS server;
detect that the DNS response message satisfies the preset rule; and
generate the offloading strategy that uses the first network address in the DNS response message as the offloading address.

11. The apparatus according to claim 10, wherein the processing circuitry is configured to:
detect that domain name information in the DNS response message satisfies a preset condition.

12. The apparatus according to claim 10, wherein the processing circuitry is configured to:
transmit the offloading strategy to a session management function entity;
receive a response message returned by the session management function entity, the response message agreeing to the offloading strategy;
activate the offloading strategy in response to the response message; and
transmit the DNS response message to the terminal device.

13. The apparatus according to claim 10, wherein the edge network transmits the first uplink data packet with a source address modification to a service scheduler having the destination address and the processing circuitry is configured to:
receive a response message that is returned by the service scheduler in response to the first uplink data packet with the source address modification, the response message comprising a second network address associated with the edge network; and
transmit the response message, to the terminal device, for the terminal device to initiate a service access request according to the second network address associated with the edge network.

14. The apparatus according to claim 13, wherein the processing circuitry is configured to:
receive a second uplink data packet transmitted by the terminal device;

transmit the second uplink data packet to the edge network in response to a destination address of the second uplink data packet matching the offloading address; and forward, in response to receiving a downlink data packet for the terminal device and from the edge network, the downlink data packet to the terminal device.

15. A non-transitory computer-readable storage medium storing instructions which when executed by at least one processor cause the at least one processor to perform:

detecting that received information included in a service flow satisfies a preset rule;

generating an offloading strategy that uses a first network address in the received information included in the service flow as an offloading address when the received information included in the service flow is detected to satisfy the preset rule; and offloading a first uplink data packet associated with the service flow from a terminal device to an edge network according to the offloading strategy, a destination address of the first uplink data packet matching the offloading address.

16. The non-transitory computer-readable storage medium according to claim 15, wherein the instructions cause the at least one processor to perform:

transmitting the offloading strategy to a session management function entity;

receiving a response message from the session management function entity;

activating the offloading strategy, in response to the response message agreeing to the offloading strategy; and deactivating the offloading strategy, in response to the response message rejecting the offloading strategy.

17. The non-transitory computer-readable storage medium according to claim 15, wherein the received information associated with the service flow is a domain name system (DNS) response message, and the instructions cause the at least one processor to perform:

receiving a DNS request transmitted by the terminal device;

transmitting the DNS request to a DNS server;

receiving the DNS response message returned by the DNS server;

detecting that the DNS response message satisfies the preset rule; and generating the offloading strategy that uses the first network address in the DNS response message as the offloading address.

18. The non-transitory computer-readable storage medium according to claim 17, wherein the instructions cause the at least one processor to perform:

detecting that domain name information in the DNS response message satisfies a preset condition.

19. The non-transitory computer-readable storage medium according to claim 17, wherein the instructions cause the at least one processor to perform:

transmitting the offloading strategy to a session management function entity;

receiving a response message returned by the session management function entity, the response message agreeing to the offloading strategy;

activating the offloading strategy in response to the response message; and transmitting the DNS response message to the terminal device.

20. The non-transitory computer-readable storage medium according to claim 17, wherein the edge network transmits the first uplink data packet with a source address modification to a service scheduler having the destination address, the instructions cause the at least one processor to perform:

receiving a response message that is returned by the service scheduler in response to the first uplink data packet with the source address modification, the response message comprising a second network address associated with the edge network; and transmitting the response message, to the terminal device, for the terminal device to initiate a service access request according to the second network address associated with the edge network.

* * * * *

UNITED STATES PATENT AND TRADEMARK OFFICE
CERTIFICATE OF CORRECTION

| | |
|---|---|
| PATENT NO. | : 12,068,962 B2 |
| APPLICATION NO. | : 17/451746 |
| DATED | : August 20, 2024 |
| INVENTOR(S) | : Zhuoyun Zhang |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Item (72), the Inventor city reads as:
Guangdong (CN)

Should read as:
--Shenzhen (CN)--

Signed and Sealed this
Seventeenth Day of September, 2024

Katherine Kelly Vidal
*Director of the United States Patent and Trademark Office*